US012623690B2

(12) United States Patent
   Lim

(10) Patent No.: US 12,623,690 B2
(45) Date of Patent: May 12, 2026

(54) AUTONOMOUS DRIVING CONTROL APPARATUS AND METHOD THEREOF

(71) Applicants: HYUNDAI MOTOR COMPANY, Seoul (KR); KIA CORPORATION, Seoul (KR)

(72) Inventor: Jung Min Lim, Gyeongju-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 210 days.

(21) Appl. No.: 17/983,184

(22) Filed: Nov. 8, 2022

(65) Prior Publication Data

US 2023/0286540 A1      Sep. 14, 2023

(30) Foreign Application Priority Data

Mar. 11, 2022    (KR) ........................ 10-2022-0030976

(51) Int. Cl.
   B60K 35/10        (2024.01)
   B60K 35/22        (2024.01)
                (Continued)

(52) U.S. Cl.
   CPC ......... B60W 60/0015 (2020.02); B60K 35/10 (2024.01); B60K 35/22 (2024.01);
                (Continued)

(58) Field of Classification Search
   CPC ........... B60W 60/0015; B60W 30/146; B60W 40/04; B60W 50/14; B60W 35/28; B60W 2050/146; B60W 2420/403; B60W 2520/06; B60W 2554/4041; B60W 2554/4044; B60W 2554/80; B60W 2556/50; B60W 2556/65; B60W 2554/4042; B60W 30/08; B60W 2552/50; B60W 60/0016; B60W 10/10; B60W 40/02; B60W 2050/143; B60K 35/00;
                (Continued)

(56) References Cited

U.S. PATENT DOCUMENTS 11,069,351 B1 *   7/2021   Menon ..................... G10L 15/22
2009/0096598 A1 *  4/2009   Tengler ................ G08G 1/0965
                                                    340/453
                (Continued)

FOREIGN PATENT DOCUMENTS

JP            2009077015 A  *  4/2009

*Primary Examiner* — Ramya P Burgess
*Assistant Examiner* — Chanmin Park
(74) *Attorney, Agent, or Firm* — Lempia Summerfield Katz LLC

(57)        ABSTRACT

An autonomous driving control apparatus for controlling autonomous driving around another vehicle that is parked includes a controller configured to receive information about an object sensed by sensors provided in one or more other vehicles from the one or more other vehicles, through a communication device provided in an autonomous vehicle. The controller is further configured to control autonomous driving around the one or more other vehicles based on the received information. The autonomous driving control apparatus allows an autonomous vehicle to safely travel in a space with many persons, such as in a public housing parking lot, a mart parking lot, or the like.

15 Claims, 10 Drawing Sheets

(51) Int. Cl.

| | |
|---|---|
| *B60K 35/28* | (2024.01) |
| *B60K 35/60* | (2024.01) |
| *B60K 35/81* | (2024.01) |
| *B60W 30/14* | (2006.01) |
| *B60W 40/04* | (2006.01) |
| *B60W 50/14* | (2020.01) |
| *B60W 60/00* | (2020.01) |
| *G06V 20/13* | (2022.01) |
| *G06V 20/58* | (2022.01) |
| *B60K 35/29* | (2024.01) |
| *B60K 35/85* | (2024.01) |

(52) U.S. Cl.

CPC .............. *B60K 35/28* (2024.01); *B60K 35/60* (2024.01); *B60K 35/81* (2024.01); *B60W 30/146* (2013.01); *B60W 40/04* (2013.01); *B60W 50/14* (2013.01); *G06V 20/13* (2022.01); *G06V 20/58* (2022.01); *B60K 35/29* (2024.01); *B60K 35/85* (2024.01); *B60K 2360/176* (2024.01); *B60K 2360/178* (2024.01); *B60K 2360/1868* (2024.01); *B60K 2360/5915* (2024.01); *B60W 2050/146* (2013.01); *B60W 2420/403* (2013.01); *B60W 2520/06* (2013.01); *B60W 2554/4041* (2020.02); *B60W 2554/4044* (2020.02); *B60W 2554/80* (2020.02); *B60W 2556/50* (2020.02); *B60W 2556/65* (2020.02)

(58) Field of Classification Search

CPC .. B60K 35/29; B60K 35/85; B60K 2360/176; B60K 2360/178; B60K 2360/1868; B60K 2360/5915; B60K 2360/179; B60K 35/22; G06V 20/13; G06V 20/58; B62D 15/0285

See application file for complete search history.

(56) References Cited

U.S. PATENT DOCUMENTS

| | | | | |
|---|---|---|---|---|
| 2020/0122744 | A1* | 4/2020 | Badigannavar | ........ G08G 1/143 |
| 2021/0318135 | A1* | 10/2021 | Chandupatla | ...... G01C 21/3682 |

* cited by examiner

START

RECEIVE INFORMATION ABOUT OBJECT
SENSED BY SENSORS PROVIDED IN ONE
OR MORE OTHER VEHICLES FROM ONE
OR MORE OTHER VEHICLES PARKED
AROUND AUTONOMOUS VEHICLE     ~S810

CONTROL AUTONOMOUS DRIVING AROUND
ONE OR MORE OTHER VEHICLES,
BASED ON RECEIVED INFORMATION     ~S820

END

AUTONOMOUS DRIVING CONTROL APPARATUS AND METHOD THEREOF

CROSS-REFERENCE TO RELATED APPLICATION

This application claims the benefit of priority to Korean Patent Application No. 10-2022-0030976, filed in the Korean Intellectual Property Office on Mar. 11, 2022, the entire contents of which are incorporated herein by reference.

TECHNICAL FIELD

The present disclosure relates to an autonomous driving control apparatus and a method thereof. More particularly, the present disclosure relates to an autonomous driving control apparatus for controlling autonomous driving around another parked vehicle and a method thereof.

BACKGROUND

An autonomous vehicle needs the capability of adaptively coping with a surrounding situation that changes in real-time while driving. First of all, a reliable determination control function is required to mass produce and enable autonomous vehicles. A semi-autonomous vehicle recently on the market basically performs driving, braking, and steering on behalf of a driver to reduce fatigue of the driver. Unlike fully autonomous driving, semi-autonomous driving should allow the driver to keep focusing on driving. For example, semi-autonomous driving should allow the driver to continue holding the steering wheel. Recently, the semi-autonomous vehicle is loaded with a highway driving assist (HDA) function, and a driver status warning (DSW) function for determining driver carelessness, such as drowsy driving or gaze departure, and for determining state abnormality and outputting a warning alarm through a cluster or the like. The semi-autonomous vehicle is also loaded with a driver awareness warning (DAW) function for determining whether the vehicle crosses the line and performs unstable driving using a front view camera, a forward collision-avoidance assist (FCA), or active emergency brake system (AEBS) function for performing emergency braking when detecting a head-on collision, or the like.

A vehicle to which an autonomous driving system is applied has been developed, and the safety system of the vehicle has advanced. However, many accidents still occur due to the systematic limitations of an existing autonomous driving system. Particularly, accidents frequently occur because of not coping with situations that suddenly occur in a space with many persons and obstacles, such as a public housing parking lot or a mart parking lot. Therefore, there is a need to develop a technology for preventing such problematic situations.

SUMMARY

The present disclosure has been made to solve the above-mentioned problems occurring in the prior art while advantages achieved by the prior art are maintained intact.

An aspect of the present disclosure provides an autonomous driving control apparatus for controlling autonomous driving around another vehicle that is parked and a method thereof.

Another aspect of the present disclosure provides an autonomous driving control apparatus for allowing an autonomous vehicle to safely travel in a space with many persons, such as a public housing parking lot or a mart parking lot, and a method thereof.

Another aspect of the present disclosure provides an autonomous driving control apparatus for delivering information about a blind spot to a user who rides in the vehicle and a method thereof.

Another aspect of the present disclosure provides an autonomous driving control apparatus for displaying hazard information to warn the user and a method thereof.

Another aspect of the present disclosure provides an autonomous driving control apparatus for sensing a surrounding obstacle using a sensor of another vehicle that is parked and a method thereof.

The technical problems to be solved by the present disclosure are not limited to the aforementioned problems. Any other technical problems not mentioned herein should be clearly understood from the following description by those having ordinary skill in the art to which the present disclosure pertains.

According to an aspect of the present disclosure, an autonomous driving control apparatus may include a communication device provided in an autonomous vehicle to communicate with one or more other vehicles parked around the autonomous vehicle. The autonomous driving control apparatus may also include a controller that receives information about an object sensed by sensors provided in the one or more other vehicles from the one or more other vehicles, through the communication device. The controller also controls autonomous driving around the one or more other vehicles based on the received information.

In an embodiment, the controller may transmit information about a position of the autonomous vehicle to the one or more other vehicles through the communication device. The one or more other vehicles may determine an approach of the autonomous vehicle, based on the information about the position of the autonomous vehicle and the information received from the autonomous vehicle, and may enable the sensors provided in the one or more other vehicles.

In an embodiment, the controller may determine the position of the autonomous vehicle using an image obtained from a global positioning system (GPS) or a camera provided in the autonomous vehicle.

In an embodiment, the one or more other vehicles may obtain a surrounding image using cameras provided in the one or more other vehicles, may determine an approach of the autonomous vehicle based on the obtained surrounding image, and may enable the sensors provided in the one or more other vehicles when the approach of the autonomous vehicle is identified.

In an embodiment, the controller may selectively receive the information about the object from the one or more other vehicles in response to a position and a driving direction of the autonomous vehicle through the communication device.

In an embodiment, the controller may fail to receive the information about the object from the one or more other vehicles, through the communication device, when a transmission of the autonomous vehicle is in a P stage.

In an embodiment, the controller may receive information about a position of each of the one or more other vehicles, a parking direction of each of the one or more other vehicles, and a position where each of the sensors sensing the object is mounted on each of the one or more other vehicles. The controller may also determine information about a position of the object based on the information about the position of each of the one or more other vehicles, the parking direction of each of the one or more other vehicles, and the position where each of the sensors sensing the object is mounted on each of the one or more other vehicles. Furthermore, the controller may control the autonomous driving based on the determined information about the position of the object.

In an embodiment, the controller may determine motion of the object based on a change in information received from the one or more other vehicles, and may control the autonomous driving based on the determined motion of the object.

In an embodiment, the controller may control the autonomous driving such that the autonomous vehicle travels at a low speed when the object disappears after being sensed.

In an embodiment, the controller may determine a distance between the autonomous vehicle and the object based on information about a position of the object, and may control the autonomous driving based on the determined distance between the autonomous vehicle and the object.

In an embodiment, the controller may determine at least one of a speed of the object or a movement direction of the object based on a change in information received from the one or more other vehicles. The controller may control the autonomous driving based on the at least determined one of the speed of the object or the movement direction of the object.

In an embodiment, the controller may control the autonomous driving based on whether the movement direction of the object is a direction towards a driving route or a road of the autonomous vehicle.

In an embodiment, the autonomous driving control apparatus may further include a display device provided in the autonomous vehicle to display various pieces of information. The one or more other vehicles may obtain an image of the object using cameras provided in the one or more other vehicles. The controller may receive the image of the object through the communication device and may output the received image of the object through the display device.

In an embodiment, the autonomous driving control apparatus may further include a display device provided in the autonomous vehicle to display various pieces of information. The controller may output information about a periphery of the autonomous vehicle through the display device. The information may include information about a position of the object.

According to an aspect of the present disclosure, an autonomous driving control method may include receiving, by a controller, information about an object sensed by sensors provided in one or more other vehicles parked around an autonomous vehicle from the one or more other vehicles through a communication device provided in an autonomous vehicle. The method may further include controlling, by the controller, autonomous driving around the one or more other vehicles based on the received information.

In an embodiment, the autonomous driving control method may further include transmitting, by the controller, information about a position of the autonomous vehicle to the one or more other vehicles through the communication device, and determining, by the one or more other vehicles, an approach of the autonomous vehicle based on the information about the position of the autonomous vehicle and the information being received from the autonomous vehicle. Furthermore, the method may include enabling, by the one or more other vehicles, the sensors provided in the one or more other vehicles when the approach of the autonomous vehicle is identified.

In an embodiment, the receiving of the information about the object sensed by the sensors provided in the one or more other vehicles parked around the autonomous vehicle from the one or more other vehicles, through the communication device, by the controller may include receiving, by the controller, information about a position of each of the one or more other vehicles, a parking direction of each of the one or more other vehicles, and a position where each of the sensors sensing the object is mounted on each of the one or more other vehicles. The controlling of the autonomous driving around the one or more other vehicles based on the received information by the controller may include determining, by the controller, information about a position of the object based on the information about the position of each of the one or more other vehicles, the parking direction of each of the one or more other vehicles, and the position where each of the sensors sensing the object is mounted on each of the one or more other vehicles. The controlling of the autonomous driving around the one or more other vehicles based on the received information by the controller may further include controlling, by the controller, the autonomous driving based on the determined information about the position of the object.

In an embodiment, the controlling of the autonomous driving around the one or more other vehicles based on the received information by the controller may include determining, by the controller, at least one of a speed of the object or a movement direction of the object based on a change in information received from the one or more other vehicles. The controlling of the autonomous driving around the one or more other vehicles based on the received information by the controller may further include controlling, by the controller, the autonomous driving, based on the at least determined one of the speed of the object or the movement direction of the object.

In an embodiment, the autonomous driving control method may further include obtaining, by the one or more other vehicles, an image of the object using cameras provided in the one or more other vehicles. The method may further include receiving, by the controller, the image of the object, through the communication device. Furthermore, the method may include outputting, by the controller, the received image of the object through a display device provided in the autonomous vehicle and configured to display various pieces of information.

In an embodiment, the autonomous driving control method may further include outputting, by the controller, information about a periphery of the autonomous vehicle, the information including information about a position of the object, through a display device provided in the autonomous vehicle and configured to display various pieces of information.

BRIEF DESCRIPTION OF THE DRAWINGS

The above and other objects, features, and advantages of the present disclosure should be more apparent from the following detailed description taken in conjunction with the accompanying drawings.

DETAILED DESCRIPTION

Figure 1:
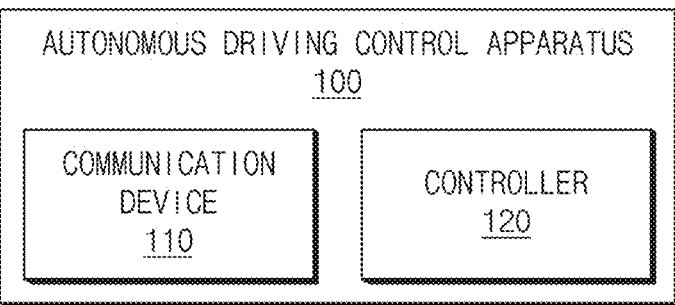
FIG. 1 is a block diagram illustrating an autonomous driving control apparatus according to an embodiment of the present disclosure.

Hereinafter, some embodiments of the present disclosure are described in detail with reference to the drawings. In the drawings, the same reference numerals are used throughout to designate the same or equivalent elements. In addition, a detailed description of well-known features or functions are ruled out in order not to unnecessarily obscure the gist of the present disclosure.

When a component, device, element, or the like of the present disclosure is described as having a purpose or performing an operation, function, or the like, the component, device, or element should be considered herein as being "configured to" meet that purpose or to perform that operation or function.

In describing the components of the embodiment, according to the present disclosure, terms such as first, second, "A," "B," (a), (b), and the like may be used. These terms are only used to distinguish one element from another element, but do not limit the corresponding elements irrespective of the order or priority of the corresponding elements. Furthermore, unless otherwise defined, all terms, including technical and scientific terms used herein, are to be interpreted as is customary in the art to which the present disclosure belongs. Such terms as those defined in a generally used dictionary are to be interpreted as having meanings equal to the contextual meanings in the relevant field of art. Such terms are not to be interpreted as having ideal or excessively formal meanings unless clearly defined as having such in the present application.

Hereinafter, embodiments of the present disclosure are described in detail with reference to FIGS. 1-9.

FIG. 1 is a block diagram illustrating an autonomous driving control apparatus according to an embodiment of the present disclosure.

An autonomous driving control apparatus 100, according to an embodiment of the present disclosure, may be implemented inside or outside a vehicle. In this case, the autonomous driving control apparatus 100 may be integrally configured with control units in the vehicle or may be implemented as a separate hardware device to be connected with the control units of the vehicle by a connection means.

As an example, the autonomous driving control apparatus 100 may be integrally configured with the vehicle or may be implemented as a separate configuration independent of the vehicle in the form of being installed/attached to the vehicle.

Alternatively, a part of the autonomous driving control apparatus 100 may be integrally configured with the vehicle, and the other may be implemented as a separate configuration independent of the vehicle in the form of being installed/attached to the vehicle.

Referring to FIG. 1, the autonomous driving control apparatus 100 may include a communication device 110 and a controller 120.

The communication device 110 may be provided in the autonomous vehicle to communicate with one or more other vehicles parked around the autonomous vehicle.

As an example, the communication device 110 may communicate with the one or more other vehicles parked around the autonomous vehicle through vehicle to everything (V2X) communication or through vehicle to vehicle (V2V) communication.

Herein, the V2X communication may be implemented through all types of communication technologies that are applicable to a vehicle on the road, which may include V2V communication.

As an example, the communication device 110 may include a communication circuit that performs communication.

As an example, the communication device 110 may deliver information, received from the other vehicle, to the controller 120.

The controller 120 may perform the overall control such that respective components may normally perform their own functions. Such a controller 120 may be implemented in the form of hardware, may be implemented in the form of software, or may be implemented in the form of a combination thereof. In one embodiment, the controller 120 may be implemented as, but not limited to, a microprocessor.

The controller 120 may include a processor which performs data processing and/or calculation described below. Furthermore, the controller 120 may include a memory which stores data or an algorithm required in a process of performing data processing and/or calculation.

The processor that may be included in the controller 120 may be an electric circuit that executes a software command. For example, the processor included in the controller 120 may be an electronic control unit (ECU), a microcontroller unit (MCU), or another sub-controller.

The memory which may be included in the controller 120 may include at least one type of storage medium, such as a flash memory type memory, a hard disk type memory, a micro type memory, a card type memory (e.g., a secure digital (SD) card or an extreme digital (XD) card), a random access memory (RAM), a static RAM (SRAM), a read-only memory (ROM), a programmable ROM (PROM), an erasable programmable read-only memory (EPROM), an electrically erasable PROM (EEPROM), a magnetic RAM (MRAM), a magnetic disk, or an optical disk.

The controller 120 may receive information about an object sensed by sensors provided in one or more other vehicles parked around the autonomous vehicle from the one or more other vehicles through the communication device 110.

As an example, before receiving information about an object from another vehicle through the communication device 110, the controller 120 may determine a position of the autonomous vehicle and may transmit information about the position of the autonomous vehicle to the other vehicle.

As an example, the controller 120 may determine the position of the autonomous vehicle using a global positioning system (GPS).

A vehicle having the autonomous driving control apparatus 100 may include a GPS receiver. The controller 120 may identify a position of the host vehicle using a method for measuring a time when a radio wave emitted from a satellite arrives at the GPS receiver.

As another example, the controller 120 may determine a position of the autonomous vehicle using an image obtained through a camera provided in the autonomous vehicle.

In an interior where communication of the GPS receiver is not smoothly performed, the controller 120 may analyze an image obtained through the camera provided in the autonomous vehicle to identify the position of the autonomous vehicle.

The camera provided in the autonomous vehicle may include at least one of a front view camera, an around view monitoring (AVM) camera, a digital side mirror (DSM) camera, a digital video recording system (DVRS) camera, a camera monitor system (CMS) camera, or a line detection camera.

As an example, the controller 120 may detect another vehicle parked around the autonomous vehicle using the obtained image and may identify a position of the autonomous vehicle based on a relationship with the detected position of the other vehicle.

Herein, the controller 120 may determine a relative position of the autonomous vehicle from the detected relationship with the other vehicle or may determine an absolute position of the autonomous vehicle with regard to an absolute position of the other vehicle, which is received through the communication device 110.

As an example, the other vehicle may determine an approach of the autonomous vehicle (i.e., an approaching autonomous vehicle) based on the information about the position of the autonomous vehicle, which is received from the autonomous vehicle. The other vehicle may also enable a sensor provided in the other vehicle when the approach of the autonomous vehicle is identified.

The sensor provided in the other vehicle may sense an object around the other vehicle using various means, such as a near infrared ray, radio-frequency identification (RFID), and a camera.

In detail, the other vehicle may determine whether the autonomous vehicle approaches the other vehicle within a predetermined specific distance based on the information about the position of the autonomous vehicle, and may enable the sensor provided in the other vehicle when the approach of the autonomous vehicle is identified.

As another example, the other vehicle may obtain a surrounding image using the camera provided in the other vehicle, may determine the approach of the autonomous vehicle based on the obtained surrounding image, and may enable the sensor provided in the other vehicle when the approach of the autonomous vehicle is identified.

The camera provided in the other vehicle may include at least one of a blackbox camera, a surround view monitor (AVM) camera, a digital video recording system (DVRS) camera, a camera monitor system (CMS) camera, or a line detection camera.

As an example, the other vehicle may identify the autonomous vehicle by analyzing a license plate or the like based on the obtained surrounding image. The other vehicle may also determine the approach of the autonomous vehicle based on a distance from the autonomous vehicle, which is calculated through the obtained surrounding image.

As another example, when the autonomous vehicle is identified using the obtained surrounding image, the other vehicle may determine that the autonomous vehicle is approaching the other vehicle.

When a surrounding object is detected by the sensor provided in the other vehicle, the other vehicle may transmit information about the detected surrounding object to the communication device 110 of the autonomous vehicle.

As an example, the controller 120 may selectively receive the information about the object from the other vehicle in response to a position and a driving direction of the autonomous vehicle through the communication device 110.

As an example, the controller 120 may receive information about the sensed object from the other vehicle parked within a predetermined specific distance from the autonomous vehicle.

In detail, the controller 120 may receive the information about the sensed object from the parked vehicle located in the driving direction with respect to the position of the autonomous vehicle. The controller 120 may fail to receive the information about the sensed object from another parked vehicle that is not located in the driving direction with respect to the position of the autonomous vehicle.

As an example, when the autonomous vehicle is being stopped, the controller 120 may receive information about the sensed object from another vehicle parked within a specific distance from the position of the autonomous vehicle without regard to the driving direction.

When the controller 120 does not receive information from the specific other parked vehicle through the communication device 110, it may mean that the communication device 110 ignores a signal received from the specific other parked vehicle, does not deliver the received signal to the controller 120, or does not store the received signal in a memory.

As an example, when the transmission of the autonomous vehicle is in a P stage (i.e., parked state), the controller 120 may fail to receive information about an object from the other vehicle through the communication device 110.

In detail, the controller 120 may be connected with the transmission of the autonomous vehicle to receive information about a gear stage and identify whether the transmission is in the P stage.

When the transmission is in the P stage, because the autonomous vehicle is parked without performing autonomous driving, the controller 120 may fail to receive the information about the object from the other vehicle through the communication device 110.

The controller 120 may control autonomous driving around the other vehicle based on the received information.

As an example, the controller 120 may control the driving, braking, and steering of the autonomous vehicle, based on the received information, to perform autonomous driving around the other vehicle.

As an example, the controller 120 may receive information about a position of the other vehicle, a parking direction of the other vehicle, and a position where a sensor sensing the object is mounted on the other vehicle through the communication device 110.

As an example, the controller 120 may determine information about a position of the object, based on the information about the position of the other vehicle, the parking direction of the other vehicle, and the position where the sensor sensing the object is mounted on the other vehicle. The controller 120 may further control autonomous driving based on the determined information about the position of the object.

Because the position of the object sensed by the sensor is able to be specified according to the position of the other vehicle, the parking direction of the other vehicle, and the position where the sensor sensing the object is mounted on the other vehicle, the controller 120 may determine the information about the position of the object. The position of the object is based on the information about the position of the other vehicle, the parking direction of the other vehicle, and the position where the sensor sensing the object is mounted on the other vehicle.

As an example, the controller 120 may perform autonomous driving at a low speed to prevent the autonomous vehicle from colliding with the object or may control autonomous driving such that the autonomous vehicle avoids the position of the object to travel, based on the determined information about the position of the object.

As an example, the controller 120 may determine a motion of the object based on a change in information received from the other vehicle, and may control autonomous driving based on the determined motion of the object.

In detail, the controller 120 may continue receiving information about the sensed object from the one or more other vehicles through the communication device 110. The controller 120 may determine the motion of the object based on a change in the sensor provided in the one or more other vehicles, which senses the object.

Figure 5:
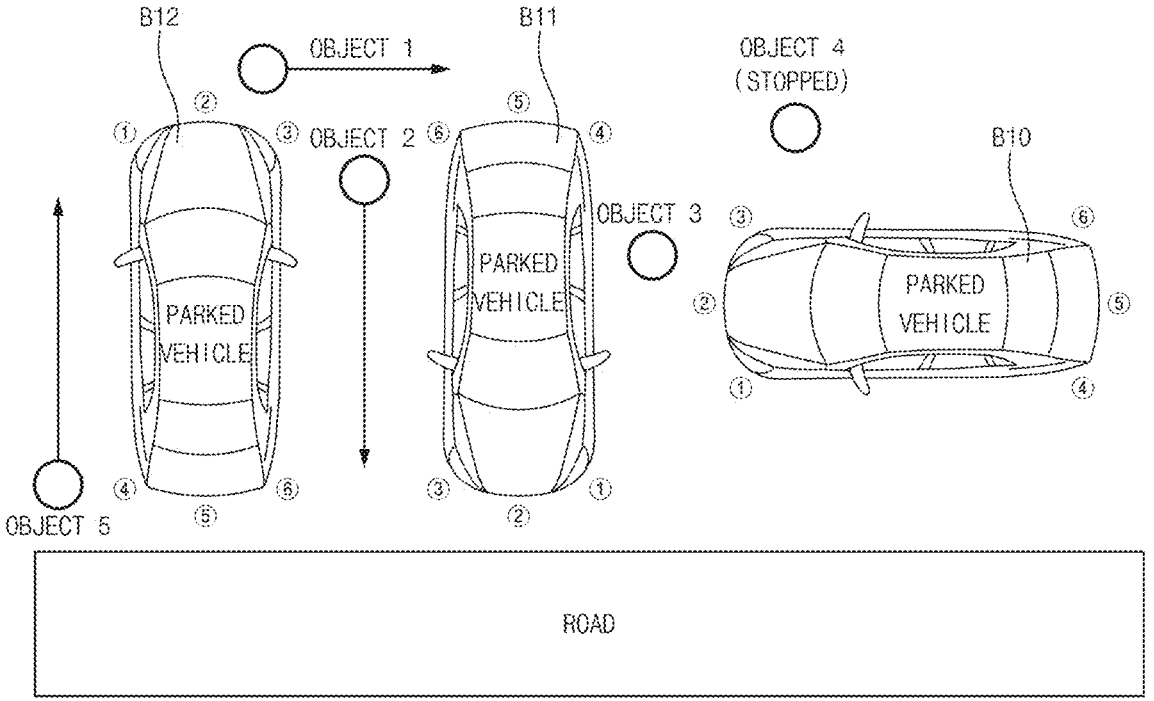
FIG. 5 is a drawing illustrating that an autonomous driving control apparatus uses sensor information of another vehicle that is parked according to an embodiment of the present disclosure.

A description is given in detail of the case where the controller 120 determines the motion of the object based on the change in information received from the other vehicle with reference to FIG. 5.

As an example, when the object disappears after being sensed, the controller 120 may control autonomous driving such that the autonomous vehicle travels at a low speed.

Herein, when the autonomous vehicle travels at a low speed, it may mean that the autonomous vehicle is traveling at a speed that is not greater than a predetermined specific speed.

Because the sensed object is able to be an animal or the like, which may move abnormally after being sensed through the sensor provided in the other vehicle, the controller 120 may control autonomous driving such that the autonomous vehicle travels at a low speed to prevent a collision with the object when the object disappears after being sensed.

As an example, the controller 120 may determine a distance between the autonomous vehicle and the object based on the information about the position of the object. The controller 120 may control autonomous driving based on the determined distance between the autonomous vehicle and the object.

In detail, the controller 120 may control autonomous driving based on whether the determined distance between the autonomous vehicle and the object is greater than a predetermined threshold.

As an example, when the determined distance between the autonomous vehicle and the object is greater than the predetermined threshold, the controller 120 may control autonomous driving such that the autonomous vehicle travels at a low speed or is stopped.

As an example, the controller 120 may determine at least one of a speed of the object or a movement direction of the object based on the change in information received from the other vehicle. The controller 120 may control autonomous driving based on the at least determined one of the speed of the object or the movement direction of the object.

In detail, when the movement direction of the object is the direction of a driving route of the autonomous vehicle, the controller 120 may control autonomous driving such that the autonomous vehicle travels at a low speed or is stopped.

As an example, when the movement direction of the object is the direction of the driving route of the autonomous vehicle, the controller 120 may control autonomous driving such that the autonomous vehicle travels at the low speed or is stopped with regard to the speed of the object and the distance between the autonomous vehicle and the object.

As an example, when the movement direction of the object is the direction of the driving route of the autonomous vehicle, when the speed of the object is greater than a predetermined threshold, or when the distance between the autonomous vehicle and the object is less than the predetermined threshold, the controller 120 may control autonomous driving such that the autonomous vehicle travels at the low speed or is stopped.

In this process, the controller 120 may control autonomous driving with regard to a time to collision calculated based on the speed of the object and the distance between the autonomous vehicle and the object.

As an example, the controller 120 may control the autonomous vehicle based on whether the movement direction of the object is a direction towards the driving route or a road of the autonomous vehicle.

In detail, when the movement direction of the object is the direction towards the driving route or the road of the autonomous vehicle, the controller 120 may determine that there is a risk of collision (e.g., risk of colliding) with the object and may control autonomous driving such that the autonomous vehicle travels at a low speed or is stopped.

In this process, the distance between the autonomous vehicle and the object, the speed of the object, or the like may be considered together.

Although not illustrated, as an example, the autonomous driving control apparatus 100 may further include a display device provided in the autonomous vehicle to display various pieces of information.

As an example, the display device may display the various pieces of information on one or more displays provided in the autonomous vehicle.

The display included in the display device may include a display of the audio, video, and navigation (AVN). However, the display included in the display device is not limited to the AVN, which may include all types of displays provided in the autonomous vehicle.

As an example, the other vehicle may obtain an image of the object using a camera provided in the other vehicle. As an example, the controller 120 may receive the image of the object through the communication device 110.

As an example, the controller 120 may output the received image of the object through the display device.

As an example, the controller 120 may display one or more images received from the one or more other vehicles on the display device at the same time.

As an example, the controller 120 may display the image received from the other vehicle, which detects the object, on the display device.

As an example, the controller 120 may output information about the periphery of the autonomous vehicle, which includes the information about the position of the object, through the display device.

As an example, the controller 120 may display the sensed information about the position of the object and the sensed risk of collision with the object together on the display device.

In detail, the controller 120 may display information about whether the sensed object is determined as an animal, information about contents to pay attention to the sensed object, information of contents indicating a route for the sensed object, and/or the like, on the display device.

Figure 2:
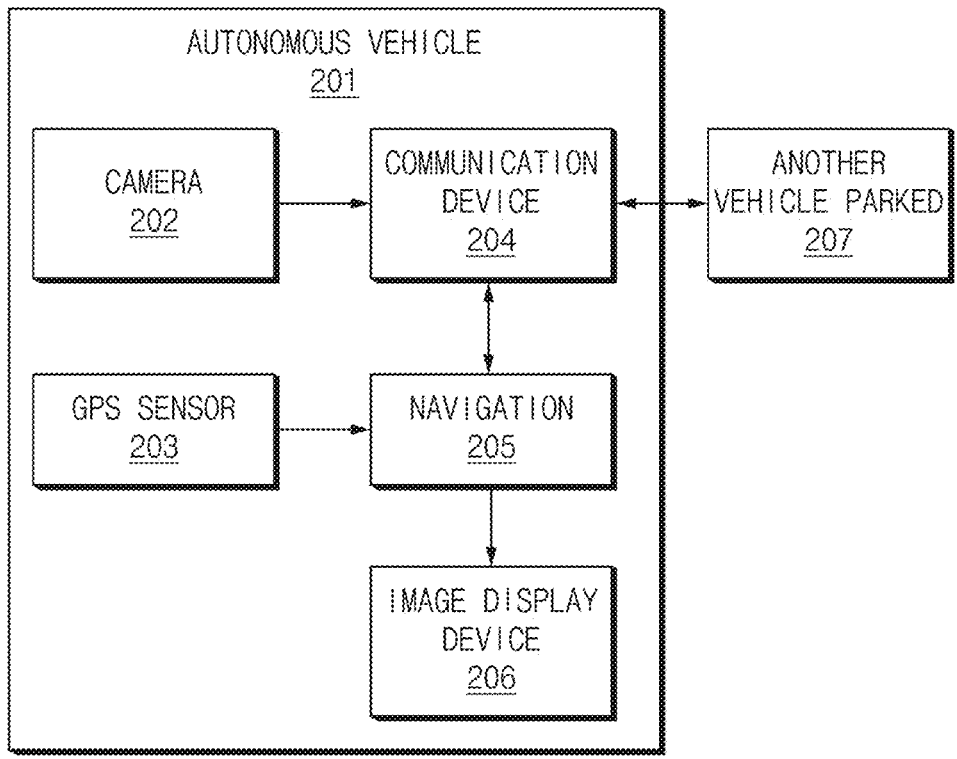
FIG. 2 is a block diagram illustrating a detailed configuration of an autonomous driving control apparatus according to an embodiment of the present disclosure.

FIG. 2 is a block diagram illustrating a detailed configuration of an autonomous driving control apparatus according to an embodiment of the present disclosure.

Referring to FIG. 2, an autonomous vehicle 201 may be configured, including a camera 202, a GPS sensor 203, a communication device 204, navigation 205, and a display device 206.

The camera 202 may include at least one of an AVM camera, a DSM camera, a DVRS camera, a CMS camera, or a line detection camera, which captures a surrounding image around the autonomous vehicle 201.

As an example, the camera 202 may deliver the captured surrounding image to the communication device 204.

The GPS sensor 203 may determine a position of the autonomous vehicle 201.

As an example, the GPS sensor 203 may identify the position of the autonomous vehicle 201 using a method for measuring a time when a radio wave emitted from a satellite arrives at the GPS sensor 203.

As an example, the GPS sensor 203 may deliver information about the position of the autonomous vehicle 201 to the navigation 205.

The communication device 204 may communicate with another vehicle 207 that is parked (i.e., other parked vehicle 207) using a V2X technology.

As an example, when the autonomous vehicle 201 enters a parking lot, the communication device 204 may transmit driving information of the autonomous vehicle 201 to the other vehicle 207 parked around the autonomous vehicle 201.

As an example, the communication device 204 may transmit a signal requesting information about a surrounding object to the other vehicle 207 parked in a driving direction of the autonomous vehicle 201.

The other parked vehicle 207 may transmit information about a surrounding object sensed by a sensor provided in the other parked vehicle 207 and a surrounding image captured using a camera provided in the other parked vehicle 207, to the communication device 204.

As an example, the other vehicle 207 parked in the driving direction of the autonomous vehicle 201 may sense the periphery of the other parked vehicle 207.

As an example, when the surrounding object is sensed, the other parked vehicle 207 may transmit information about the sensed surrounding object to the communication device 204.

The autonomous vehicle 201 may control autonomous driving based on the information about the surrounding object sensed from the other parked vehicle 207.

As an example, the communication device 204 may communicate with the navigation 205 through inter-vehicle communication.

As an example, the communication device 204 may deliver information received from the other parked vehicle 207 to the navigation 205.

The navigation 205 may include a display that displays surrounding map information.

As an example, the navigation 205 may display the information about the object sensed from the other parked vehicle 207 together with the surrounding map information.

As an example, the navigation 205 may deliver the image captured from the other parked vehicle 207 on the display.

As another example, the navigation 205 may deliver the image, captured from the other parked vehicle 207, to the image display device 206.

The image display device 206 may display the image captured from the other parked vehicle 207 on the display included in the image display device 206.

Figure 3:
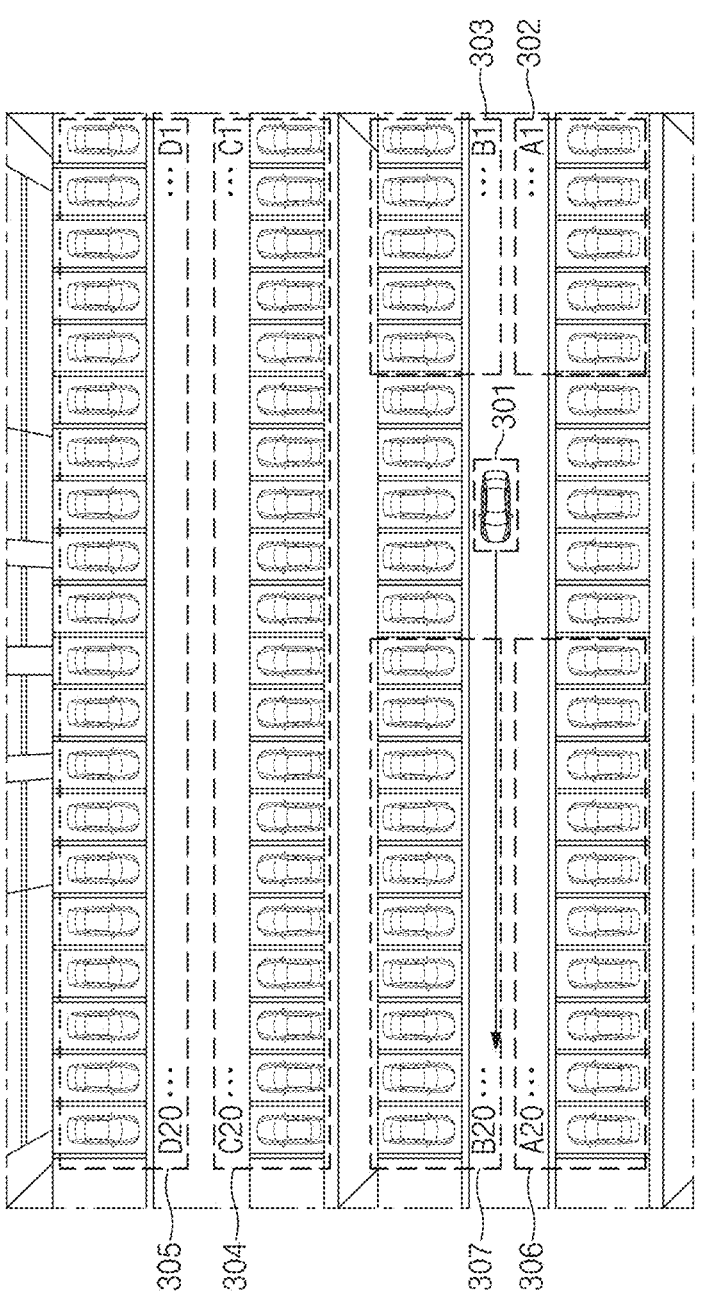
FIG. 3 is a drawing illustrating that an autonomous driving control apparatus controls autonomous driving around another vehicle that is parked according to an embodiment of the present disclosure.

FIG. 3 is a drawing illustrating that an autonomous driving control apparatus controls autonomous driving around another vehicle that is parked according to an embodiment of the present disclosure.

Referring to FIG. 3, other vehicles A1-A20, B1-B20, C1-C20, and D1-D20 may be parked in a parking lot that an autonomous vehicle 301 enters.

The present disclosure is not limited thereto, and is applicable when other vehicles are not parked in the entire space.

When entering the parking lot, the autonomous vehicle 301 may determine a position of the autonomous vehicle 301 using a GPS or an image obtained through a camera provided in the autonomous vehicle 301.

For example, the autonomous vehicle 301 may determine that the autonomous vehicle 301 is located between A8 and B8, using the image obtained through the camera provided in the autonomous vehicle 301.

The other parked vehicles A1-D20 may identify the approaching autonomous vehicle 301 using images obtained through cameras provided in the other parked vehicles A1-D20 or through communication with the autonomous vehicle 301.

When the approaching of the autonomous vehicle 301 is identified, the other parked vehicles A1-D20 may enable sensors provided in the other parked vehicles A1-D20.

For example, the other parked vehicles A6-A10 and B6-B10 may identify the approaching autonomous vehicle 301 and may enable sensors provided in the other parked vehicles A6-A10 and B6-B10.

For example, identifying the approaching autonomous vehicle 301, the other parked vehicles A6-A10 and B6-B10 may enable the sensors provided in the other parked vehicles A6-A10 and B6-B10.

In another example, not identifying the approaching autonomous vehicle 301, other parked vehicles 302, 303, 304, 305, 306, and 307 may fail to enable sensors provided in the other parked vehicles 302, 303, 304, 305, 306, and 307.

When sensing a surrounding object using the sensors provided in the other parked vehicles A1-D20, the other parked vehicles A1-D20 may transmit information about the sensed object to the autonomous vehicle 301.

The autonomous vehicle 301 may receive the information about the object from another vehicle located in a driving direction of the autonomous vehicle 301 with respect to a current position of the autonomous vehicle 301 among the other vehicles which transmit the information about the sensed object to the autonomous vehicle 301.

The autonomous vehicle 301 may fail to receive the information about the object from another vehicle that is not located in the driving direction of the autonomous vehicle 301 with respect to the current position of the autonomous vehicle 301 among the other vehicles which transmit the information about the sensed object to the autonomous vehicle 301.

For example, when the other parked vehicles A6 and B10 transmit the information about the sensed object to the autonomous vehicle 301, and when the autonomous vehicle 301 is located between A8 and B8 and is traveling forward, the autonomous vehicle 301 may receive only information transmitted from the other parked vehicle B10, which is located in the driving direction with respect to the current position of the autonomous vehicle 301, and may fail to receive information transmitted from the other parked vehicle A6, which is not located in the driving direction with respect to the current position of the autonomous vehicle 301.

In another example, when the other parked vehicles A6 and B10 transmit the information about the sensed object to the autonomous vehicle 301, and when the autonomous vehicle 301 is located between A8 and B8 and is stopped, the autonomous vehicle 301 may receive all of the pieces of information transmitted from the other parked vehicles B10 and A6. The other parked vehicle B10 is located in the driving direction with respect to the current position of the autonomous vehicle 301, and the other parked vehicle A6 is not located in the driving direction with respect to the current position of the autonomous vehicle 301.

In another example, when the other parked vehicles A6 and B10 transmit the information about the sensed object to the autonomous vehicle 301, and when the autonomous vehicle 301 is located between A8 and B8 and is traveling backward, the autonomous vehicle 301 may receive only information transmitted from the other parked vehicle A6 and may fail to receive information transmitted from the other parked vehicle B10. The other parked vehicle A6 is located in the driving direction with respect to the current position of the autonomous vehicle 301, while the other parked vehicle B10 is not located in the driving direction with respect to the current position of the autonomous vehicle 301.

In another example, when the other parked vehicles A6 and B10 transmit the information about the sensed object to the autonomous vehicle 301, and when the autonomous vehicle 301 is located between A8 and B8 and the transmission of the autonomous vehicle 301 is in a P stage, the autonomous vehicle 301 may fail to receive all of the pieces of information from the other parked vehicles A6 and B10.

Figure 4:
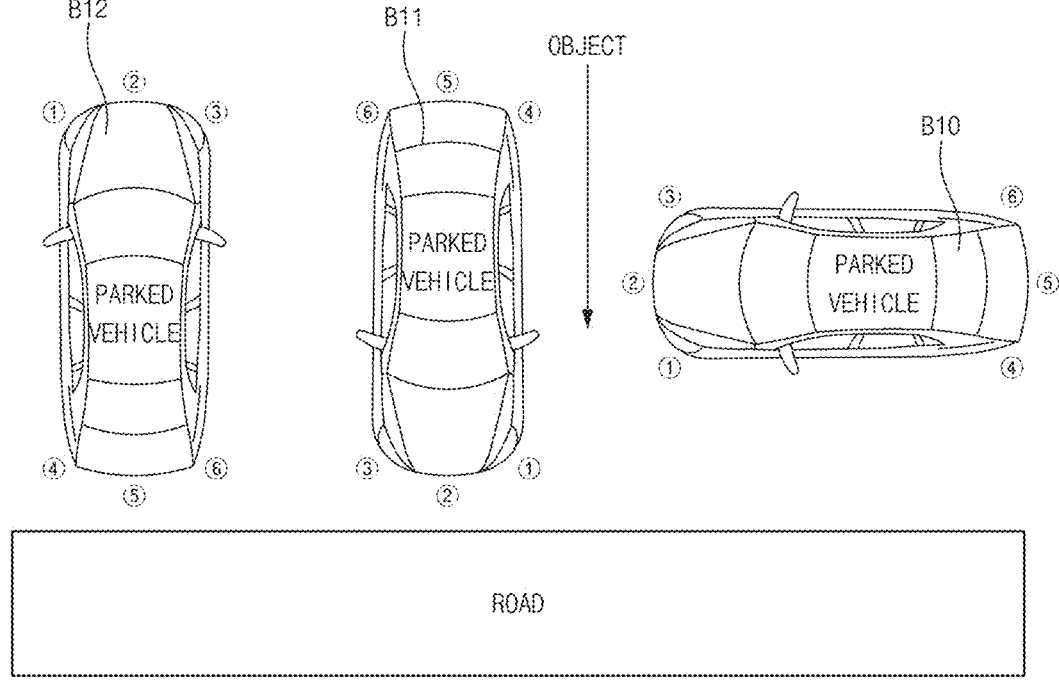
FIG. 4 is a drawing illustrating that an autonomous driving control apparatus uses sensor information of another vehicle that is parked according to an embodiment of the present disclosure.

FIG. 4 is a drawing illustrating that an autonomous driving control apparatus uses sensor information of another parked vehicle according to an embodiment of the present disclosure.

The autonomous driving control apparatus may receive pieces of information about parking positions, parking directions, and positions of sensors that sense an object from other parked vehicles B10, B11, and B12.

The autonomous driving control apparatus may determine a position of the object, based on the pieces of information about the parking positions, the parking directions, and the positions of the sensors which sense the object, which are received from the other parked vehicles B10, B11, and B12.

For example, in the shown situation, the autonomous driving control apparatus may receive pieces of information about the position of the other parked vehicle B10, including that the other vehicle B10 is parked in the direction of nine o'clock and that the object is sensed using a No. 3 sensor provided in the other parked vehicle B10, all from the other parked vehicle B10.

For example, in the shown situation, the autonomous driving control apparatus may receive pieces of information about the position of the other parked vehicle B11, including that the other vehicle B11 is parked in the direction of six o'clock and that the object is sensed using a No. 4 sensor provided in the other parked vehicle B11, all from the other parked vehicle B11.

In such a situation, the autonomous driving control apparatus may specify a position of the sensed object based on the pieces of information received from the other parked vehicles B10 and B11.

Furthermore, the autonomous driving control apparatus may continuously receive pieces of sensing information from the other parked vehicles B10 and B11.

As an example, when the object that is sensed from the other vehicles B10 and B11 is not suddenly sensed, the autonomous driving control apparatus may display a last position where the object was sensed on a display device and may continuously output a warning.

The autonomous driving control apparatus may determine motion of the sensed object based on the pieces of information received from the other vehicles B10 and B11.

As an example, after the object is sensed by the No. 3 sensor of the other vehicle B10 and the No. 4 sensor of the other vehicle B11, and when the object is sensed by a No. 2 sensor of the other vehicle B10, the autonomous driving control apparatus may determine that the sensed object is moving in the direction of the road.

FIG. 5 is a drawing illustrating that an autonomous driving control apparatus uses sensor information of another vehicle that is parked according to an embodiment of the present disclosure.

The autonomous driving control apparatus may display information about an object sensed from another vehicle that is parked, based on the information about the sensed object, and may control autonomous driving.

As an example, after object 1 is sensed by a No. 3 sensor of another vehicle B12 parked in the direction of twelve o'clock, and when object 1 is sensed by a No. 6 sensor of another vehicle B11 parked in the direction of six o'clock, the autonomous driving control apparatus may determine a movement direction of the sensed object 1 as a right direction.

In this case, the autonomous driving control apparatus may display pieces of information about a position where object 1 is sensed and a movement direction of object 1 on its display device. The autonomous driving control apparatus may control autonomous driving such that an autonomous vehicle travels at a normal speed.

As an example, when it is sensed that object 2, sensed using sensors of the other vehicles B11 and B12, is quickly moving over a predetermined threshold in the direction of the road, the autonomous driving control apparatus may control a speed of the autonomous vehicle with regard to a current distance between the autonomous vehicle and the sensed object 2.

As an example, when it is sensed that object 2, sensed using the sensors of the other vehicles B11 and B12, is quickly moving over the predetermined threshold in the direction of the road, the autonomous driving control apparatus may control autonomous driving. The autonomous driving control apparatus may control autonomous driving such that the autonomous vehicle is stopped when it is determined that the current distance between the autonomous vehicle and the sensed object 2 is short according to a predetermined criterion.

As an example, when it is sensed that object 2, sensed using the sensors of the other vehicles B11 and B12, is quickly moving over the predetermined threshold in the direction of the road, the autonomous driving control apparatus may control autonomous driving. The autonomous driving control apparatus may control autonomous driving such that the autonomous vehicle travels at a low speed when it is determined that the current distance between the autonomous vehicle and the sensed object 2 is not short according to the predetermined criterion.

As an example, after object 3 is sensed by a No. 2 sensor of the other vehicle B10, parked in the direction of nine o'clock, and when abnormal sensing data where object 3 is not suddenly sensed is received, the autonomous driving control apparatus may determine object 3 as an object having abnormal motion e.g., an animal, human, or the like.

In this case, the autonomous driving control apparatus may display, on the display device, information about a position where object 3 was last sensed. The autonomous driving control apparatus may also control autonomous driving such that the autonomous driving control apparatus travels at a low speed.

When object 4 is continuously sensed by a No. 3 sensor of the other vehicle B10, parked in the direction of nine o'clock, the autonomous driving control apparatus may determine that object 4 is stopped.

In this case, the autonomous driving control apparatus may display information about a position of object 4 on the display device, and may control autonomous driving such that an autonomous vehicle travels at a normal speed.

As an example, when it is sensed that object 5, sensed using the sensor of the other vehicle B12 that is parked in the direction of twelve o'clock, is moving in the direction of being distant from the road (i.e., away from the road), the autonomous driving control apparatus may fail to display a warning about object 5 on the display device. Thus, the autonomous driving control apparatus may control autonomous driving such that the autonomous vehicle travels at the normal speed.

Figure 6:
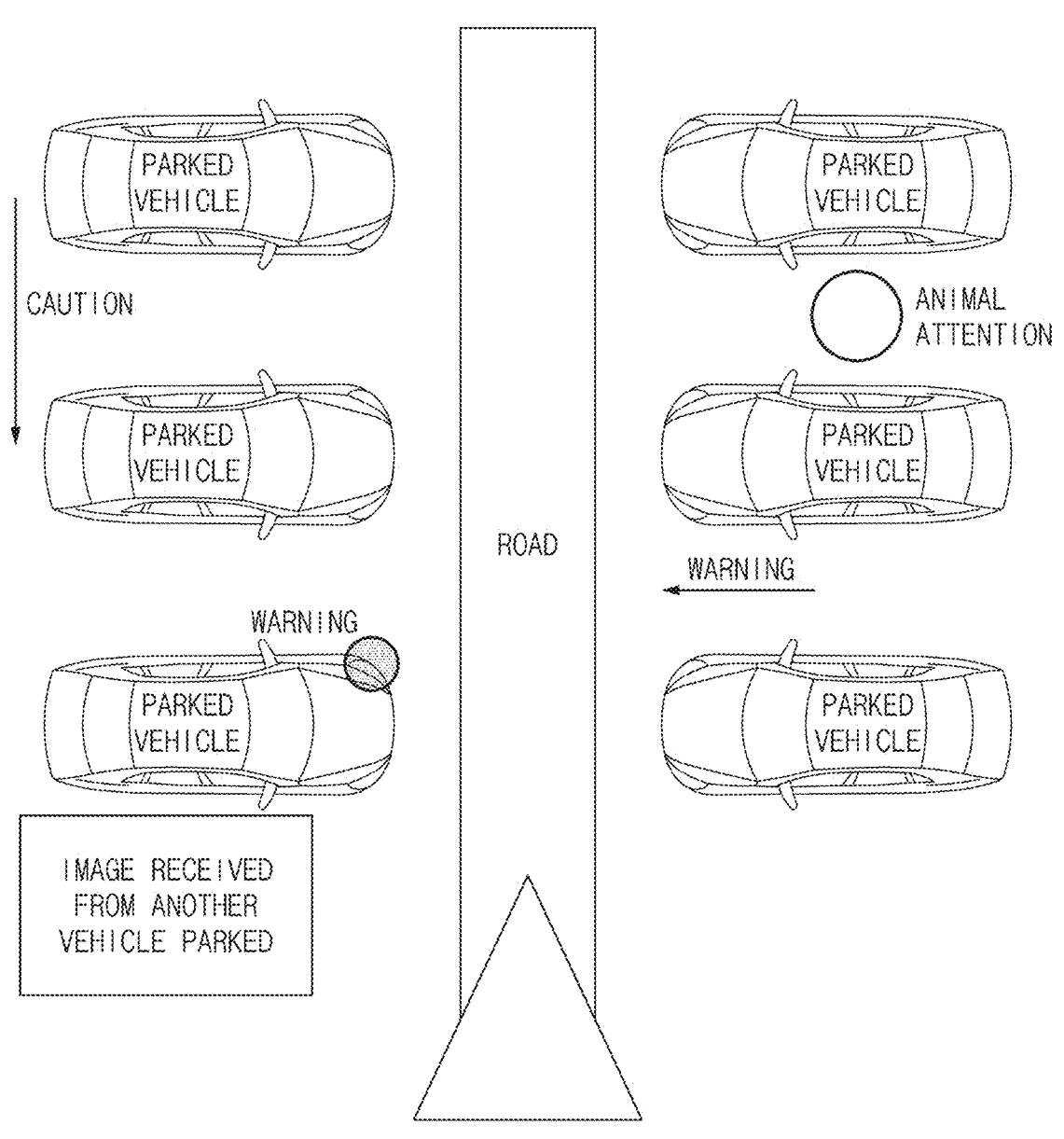
FIG. 6 is a drawing illustrating that an autonomous driving control apparatus displays various pieces of information according to an embodiment of the present disclosure.

FIG. 6 is a drawing illustrating that an autonomous driving control apparatus displays various pieces of information according to an embodiment of the present disclosure.

Referring to FIG. 6, the autonomous driving control apparatus may display, on its display device, information about an object sensed from another vehicle that is parked.

As an example, the autonomous driving control apparatus may output a map where pieces of information about a road where an autonomous vehicle is traveling and another vehicle is parked are displayed through the display device.

As an example, when there is a sensed object on the map, the autonomous driving control apparatus may display information about the sensed object together on the display device.

When a plurality of objects are sensed, the autonomous driving control apparatus may output the plurality of objects on the map at the same time through the display device.

As an example, the autonomous driving control apparatus may determine a risk of collision with the sensed object with regard to a distance between the autonomous vehicle and the sensed object, a speed of the sensed object, and a movement direction of the sensed object. When the sensed object is determined as an object having the risk of collision, the autonomous driving control apparatus may output a warning about the sensed object on the display device.

As an example, when the sensed object is not suddenly sensed after being sensed, the autonomous driving control apparatus may determine the sensed object as an object having abnormal motion, e.g., an animal, human, or the like. When the sensed object is determined as the object having the abnormal motion, the autonomous driving control apparatus may output caution for the object having the abnormal motion through the display device.

As an example, when the sensed object is not moving in the direction of the road, the autonomous driving control apparatus may determine that there is no risk of collision with the sensed object. When there is no risk of collision with the sensed object, the autonomous driving control apparatus may fail to output a warning about the sensed object through the display device and may output contents of paying attention to the sensed object.

As an example, information about the road where the autonomous vehicle is traveling, information about the other parked vehicle, map information, or the like may be schematically displayed.

As an example, the warning about the sensed object, the caution for the sensed object, the contents that the sensed object is the object having the abnormal motion, or the like, may be displayed using text.

Furthermore, the autonomous driving control apparatus may display an image received from the other parked vehicle on the display device.

As an example, the autonomous driving control apparatus may display an image together on a display which is included in the display device to display information about the object sensed from the other parked vehicle.

As another example, the autonomous driving control apparatus may display the image on a display that is different from the display that displays the information about the object sensed from the other parked vehicle.

Figure 7A:
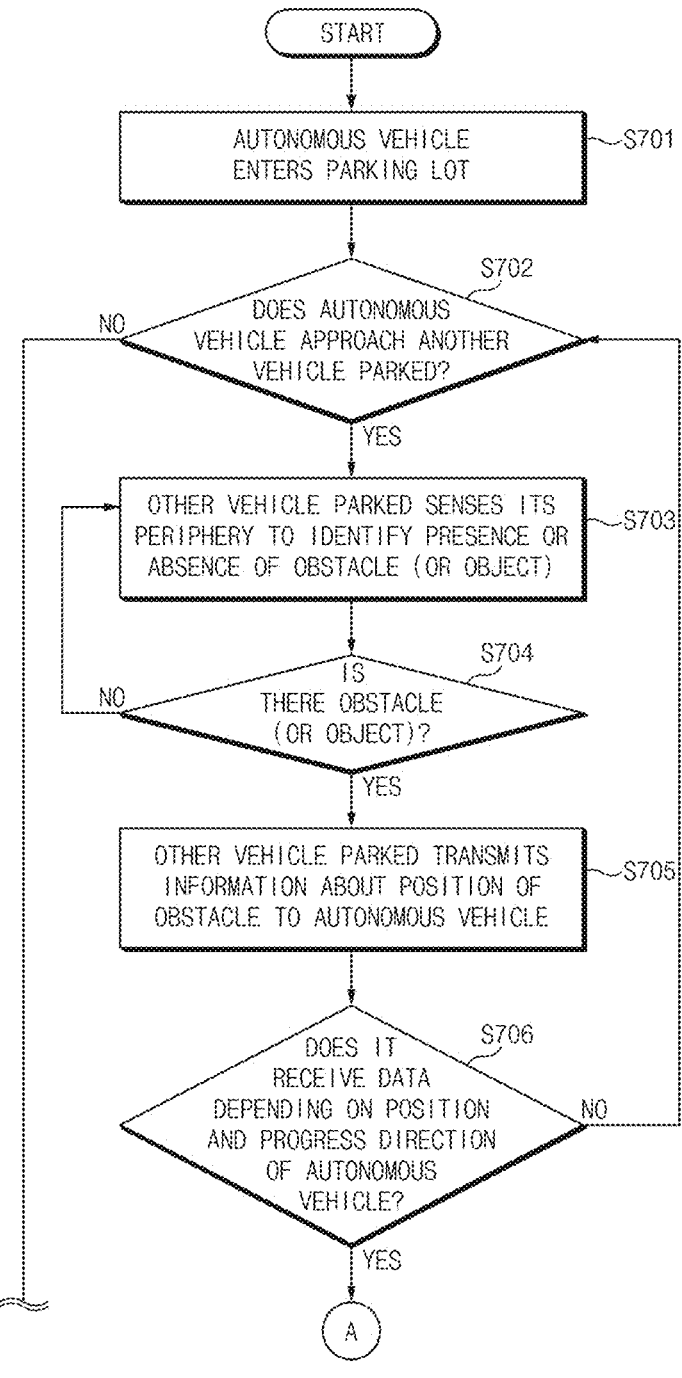
FIGS. 7A and 7B is a flowchart illustrating an operation of an autonomous driving control apparatus according to an embodiment of the present disclosure.
Figure 7B:
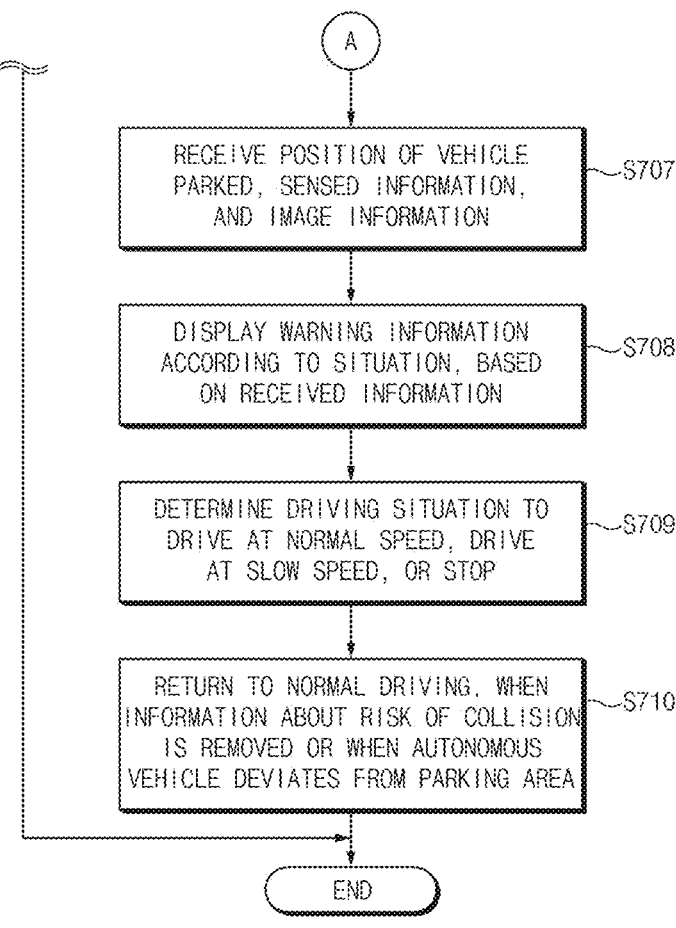

FIG. 7A and FIG. 7B is a flowchart illustrating an operation of an autonomous driving control apparatus according to an embodiment of the present disclosure.

Referring to FIGS. 7A and 7B, in S701, an autonomous vehicle may enter a parking lot.

The autonomous vehicle may identify that the autonomous vehicle enters the parking lot. When it is identified that the autonomous vehicle enters the parking lot, the autonomous vehicle may control autonomous driving based on information about an object sensed using a sensor provided in another vehicle that is parked (i.e., another parked vehicle).

In S702, the other vehicle that is parked may identify whether the autonomous vehicle approaches the other parked vehicle.

When the autonomous vehicle approaches the other parked vehicle, in S703, the other parked vehicle may sense its periphery to identify the presence or absence of an obstacle (or an object).

In S704, the other parked vehicle may identify whether there is an obstacle (or an object).

When it is identified that there is no obstacle (or object), the other parked vehicle may return to S703 to sense the periphery to identify the presence or absence of the obstacle (or the object).

When it is identified that the obstacle (or the object) is present, in S705, the other parked vehicle may transmit information about a position of the obstacle.

As an example, the other parked vehicle may transmit information about a position of a sensor that senses the obstacle, information about a parking direction of the other parked vehicle, and information about a parking position of the other parked vehicle to the autonomous vehicle.

As an example, when it is identified that the obstacle (or the object) is present, the other parked vehicle may transmit a surrounding image obtained using a camera provided in the other parked vehicle to the autonomous vehicle.

In S706, the autonomous driving control apparatus may determine whether to receive data from the other parked vehicle, depending on a position and a progress direction of the autonomous vehicle.

As an example, the autonomous driving control apparatus may receive data from another parked vehicle in the progress direction of the autonomous vehicle with respect to the position of the autonomous vehicle. The autonomous driving control apparatus may fail to receive data from another parked vehicle parked in a direction rather than the progress direction of the autonomous vehicle with respect to the position of the autonomous vehicle.

When it is determined not to receive the data from the other parked vehicle according to the position and the progress direction of the autonomous vehicle, the other parked vehicle may return to S702 to identify whether the autonomous vehicle approaches the other parked vehicle.

When it is determined to receive the data from the other parked vehicle according to the position and the progress direction of the autonomous vehicle, in S707, the autonomous driving control apparatus may receive a position of the parked vehicle, sensed information, and image information.

As an example, the autonomous driving control apparatus may receive information about a position of a sensor that senses an obstacle, information about a parking direction of the other parked vehicle, information about a parking position of the other parked vehicle, and surrounding image information obtained using a camera provided in the other parked vehicle.

In S708, the autonomous driving control apparatus may display warning information according to a situation based on the received information.

As an example, the autonomous driving control apparatus may display information about a position of the sensed object, information about a movement direction of the sensed object, information indicating whether the sensed object is an abnormally moving object, and/or a risk of collision with the sensed object on its display device.

In S709, the autonomous driving control apparatus may determine a driving situation and may perform autonomous driving using driving at a normal speed, driving at a low speed, or stopping.

As an example, the autonomous driving control apparatus may control autonomous driving of the autonomous vehicle with regard to a speed of the sensed object, a distance between the autonomous vehicle and the sensed object, a movement direction of the sensed object, or the like.

When information about the risk of collision is removed or when the autonomous vehicle deviates from a parking area, in S710, the autonomous driving control apparatus may return to normal driving.

Figure 8:
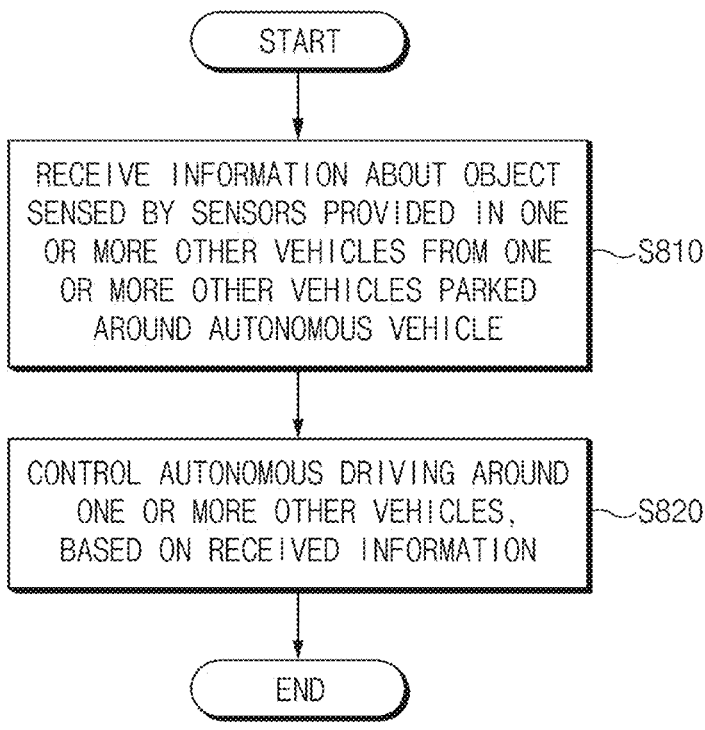
FIG. 8 is a flowchart illustrating an autonomous driving control method according to an embodiment of the present disclosure.

FIG. 8 is a flowchart illustrating an autonomous driving control method according to an embodiment of the present disclosure.

Referring to FIG. 8, the autonomous driving control method may include receiving (S810) information about an object sensed by sensors provided in one or more other vehicles parked around an autonomous vehicle from the one or more other vehicles.

The autonomous driving control method may further include controlling (S820) autonomous driving around the one or more other vehicles based on the received information.

The receiving (S810) of the information about the object sensed by the sensors provided in the one or more other vehicles parked around the autonomous vehicle from the one or more other vehicles may be performed by a controller and a communication device.

As an example, the receiving (S810) of the information about the object sensed by the sensors provided in the one or more other vehicles parked around the autonomous vehicle from the one or more other vehicles may include receiving, by the controller, information about a position of each of the one or more other vehicles, a parking direction of each of the one or more other vehicles, and a position where each of the sensors sensing the object is mounted on each of the one or more other vehicles.

The controlling (S820) of the autonomous driving around the one or more other vehicles, based on the received information, may be performed by the controller.

As an example, the controlling (S820) of the autonomous driving around the one or more other vehicles, based on the received information, may include determining, by the controller, information about a position of the object based on the information about the position of each of the one or more other vehicles, the parking direction of each of the one or more other vehicles, and the position where each of the sensors sensing the object is mounted on each of the one or more other vehicles. Furthermore, the controlling (S820) of the autonomous driving around the one or more other vehicles, based on the received information, may include controlling, by the controller, the autonomous driving based on the determined information about the position of the object.

As an example, the controlling (S820) of the autonomous driving around the one or more other vehicles, based on the received information, may include determining, by the controller, at least one of a speed of the object or a movement direction of the object based on a change in information received from the one or more other vehicles. Furthermore, the controlling (S820) of the autonomous driving around the one or more other vehicles, based on the received information, may include controlling, by the controller, the autonomous driving, based on the at least determined one of the speed of the object or the movement direction of the object.

Although not illustrated, as an example, the autonomous driving control method may further include transmitting, by the controller, information about a position of the autonomous vehicle to the one or more other vehicles through a communication device, and determining, by the one or more other vehicles, approaching of the autonomous vehicle based on the information about the position of the autonomous vehicle, which is received from the autonomous vehicle. Further, the autonomous driving control method may include enabling, by the one or more other vehicles, the sensors provided in the one or more other vehicles when the approaching of the autonomous vehicle is identified.

Although not illustrated, as an example, the autonomous driving control method may further include obtaining, by the one or more other vehicles, an image of the object using cameras provided in the one or more other vehicles. Furthermore, the autonomous driving control method may include receiving, by the controller, the image of the object through the communication device. Additionally, the autonomous driving control method may include outputting, by the controller, the received image of the object through a display device provided in the autonomous vehicle to display various pieces of information.

Although not illustrated, as an example, the autonomous driving control method may further include outputting, by the controller, information about the periphery of the autonomous vehicle, which includes the information about the position of the object, through a display device provided in the autonomous vehicle to display various pieces of information.

Figure 9:
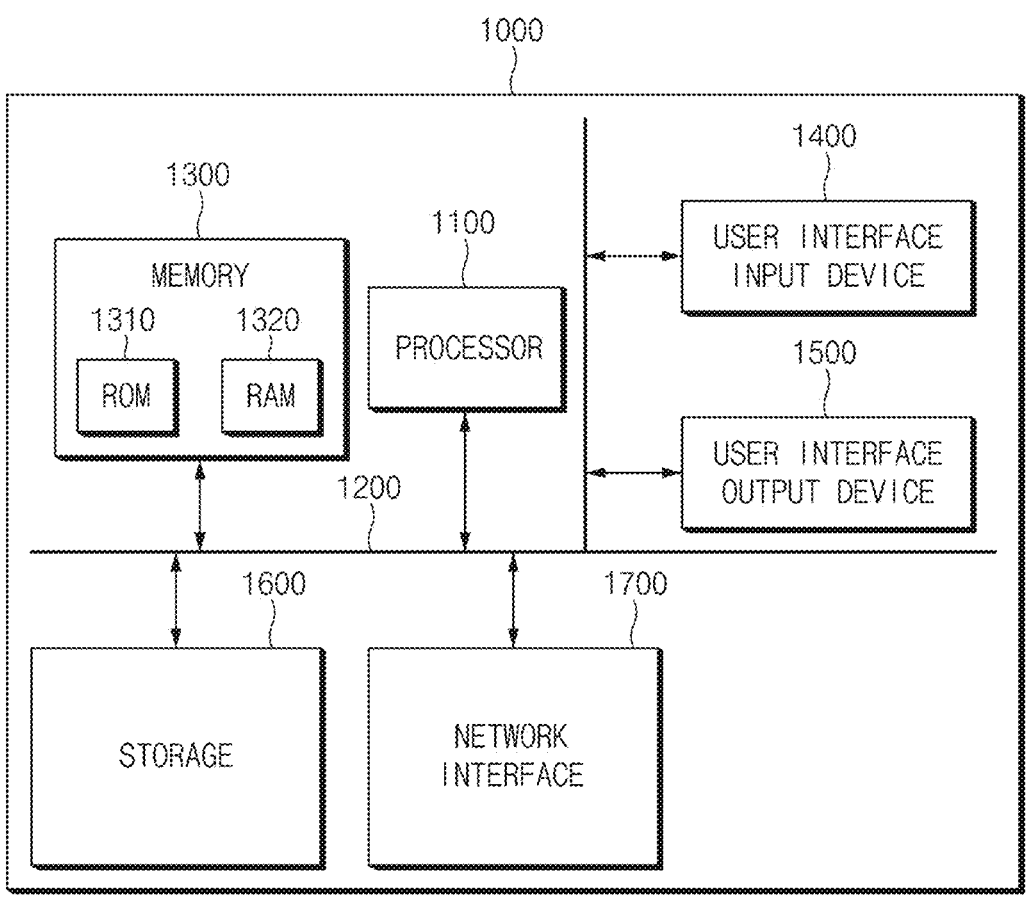
FIG. 9 is a block diagram illustrating a computing system according to an embodiment of the present disclosure.

FIG. 9 is a block diagram illustrating a computing system according to an embodiment of the present disclosure.

Referring to FIG. 9, a computing system 1000 may include at least one processor 1100, a memory 1300, a user interface input device 1400, a user interface output device 1500, storage 1600, and a network interface 1700, which are connected with each other via a bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a ROM (Read Only Memory) 1310 and a RAM (Random Access Memory) 1320.

Thus, the operations of the method or the algorithm described in connection with the embodiments disclosed herein may be embodied directly in hardware or a software module executed by the processor 1100, or in a combination thereof. The software module may reside on a storage medium (i.e., the memory 1300 and/or the storage 1600) such as a RAM, a flash memory, a ROM, an EPROM, an EEPROM, a register, a hard disk, a removable disk, and a compact disc read-only memory (CD-ROM).

The storage medium may be coupled to the processor 1100. The processor 1100 may read out information from the storage medium and may write information in the storage medium.

Alternatively, the storage medium may be integrated with the processor 1100. The processor and the storage medium may reside in an application specific integrated circuit (ASIC). The ASIC may reside within a user terminal. In another case, the processor and the storage medium may reside in the user terminal as separate components.

A description is given of effects of the autonomous driving control apparatus and the method thereof according to an embodiment of the present disclosure.

According to at least one of the embodiments of the present disclosure, the autonomous driving control apparatus and the method thereof may be provided to control autonomous driving around another vehicle that is parked.

Furthermore, according to at least one of the embodiments of the present disclosure, the autonomous driving control apparatus and the method thereof may be provided to allow an autonomous vehicle to safely travel in a space with many persons, such as a public housing parking lot or a mart parking lot.

Furthermore, according to at least one of the embodiments of the present disclosure, the autonomous driving control apparatus and the method thereof may be provided to deliver information about a blind spot to a user who rides in the vehicle.

Furthermore, according to at least one of the embodiments of the present disclosure, the autonomous driving control apparatus and the method thereof may be provided to display hazard information to warn the user.

Furthermore, according to at least one of the embodiments of the present disclosure, the autonomous driving control apparatus and the method thereof may be provided to sense a surrounding obstacle using a sensor of another vehicle that is parked.

In addition, various effects ascertained directly or indirectly through the present disclosure may be provided.

Hereinabove, although the present disclosure has been described with reference to embodiments and the accompanying drawings, the present disclosure is not limited thereto. However, the present disclosure may be variously modified and altered by those having ordinary skill in the art to which the present disclosure pertains without departing from the spirit and scope of the present inventive concept claimed in the following claims.

Therefore, embodiments of the present disclosure are not intended to limit the technical spirit of the present disclosure, but are provided only for the illustrative purpose. The scope of the present disclosure should be construed based on the accompanying claims, and all the technical ideas within the scope equivalent to the claims should be included in the scope of the present disclosure.

What is claimed is:

1. An autonomous driving control apparatus, comprising:
a communication device provided in an autonomous vehicle and configured to communicate with one or more other vehicles parked around the autonomous vehicle; and
a controller configured to receive information about an object sensed by sensors provided in the one or more other vehicles from the one or more other vehicles through the communication device, and to control autonomous driving around the one or more other vehicles based on the received information,
wherein the controller is further configured to:
receive the information about the object from the one or more other vehicles that are located in a driving direction of the autonomous vehicle;
not receive the information about the object from the one or more other vehicles that are not located in the driving direction of the autonomous vehicle; and
transmit information about a position of the autonomous vehicle to the one or more other vehicles, through the communication device,
wherein the one or more other vehicles determine an approach of the autonomous vehicle, based on the information about the position of the autonomous vehicle and the information received from the autonomous vehicle, and enable the sensors provided in the one or more other vehicles,
wherein the controller determines motion of the object, based on a change in information received from the one or more other vehicles, and controls the autonomous driving based on the determined motion of the object, and
wherein the controller is further configured to:
receive information about a position of each of the one or more other vehicles, a parking direction of each of the one or more other vehicles, and a position where each of the sensors sensing the object is mounted on each of the one or more other vehicles;
determine information about a position of the object, based on the information about the position of each of the one or more other vehicles, the parking direction of each of the one or more other vehicles, and the position where each of the sensors sensing the object is mounted on each of the one or more other vehicles; and
control the autonomous driving based on the determined information about the position of the object.

2. The autonomous driving control apparatus of claim 1, wherein the controller determines the position of the autonomous vehicle using an image obtained from a global positioning system (GPS) or a camera provided in the autonomous vehicle.

3. The autonomous driving control apparatus of claim 1, wherein the one or more other vehicles obtain a surrounding image using cameras provided in the one or more other vehicles, determine an approach of the autonomous vehicle based on the obtained surrounding image, and enable the sensors provided in the one or more other vehicles, when the approach of the autonomous vehicle is identified.

4. The autonomous driving control apparatus of claim 1, wherein the controller selectively receives the information about the object from the one or more other vehicles in response to a position and the driving direction of the autonomous vehicle through the communication device.

5. The autonomous driving control apparatus of claim 1, wherein the controller fails to receive the information about the object from the one or more other vehicles, through the communication device, when a transmission of the autonomous vehicle is in a P stage.

6. The autonomous driving control apparatus of claim 1, wherein the controller controls the autonomous driving such that the autonomous vehicle travels at a low speed when the object disappears after being sensed.

7. The autonomous driving control apparatus of claim 1, wherein the controller determines a distance between the autonomous vehicle and the object, based on information about a position of the object, and controls the autonomous driving based on the determined distance between the autonomous vehicle and the object.

8. The autonomous driving control apparatus of claim 1, wherein the controller determines at least one of a speed of the object or a movement direction of the object, based on the change in information received from the one or more other vehicles, and wherein the controller controls the autonomous driving based on the at least determined one of the speed of the object or the movement direction of the object.

9. The autonomous driving control apparatus of claim 8, wherein the controller controls the autonomous driving based on whether the movement direction of the object is a direction towards a driving route or a road of the autonomous vehicle.

10. The autonomous driving control apparatus of claim 1, further comprising:

a display device provided in the autonomous vehicle and configured to display various pieces of information, wherein the one or more other vehicles obtain an image of the object using cameras provided in the one or more other vehicles, and wherein the controller receives the image of the object through the communication device and outputs the received image of the object through the display device.

11. The autonomous driving control apparatus of claim 1, further comprising:

a display device provided in the autonomous vehicle and configured to display various pieces of information, wherein the controller outputs information about a periphery of the autonomous vehicle through the display device, the information including information about a position of the object.

12. An autonomous driving control method, comprising:

transmitting, by a controller, information about a position of an autonomous vehicle to one or more other vehicles, through a communication device;

determining, by the one or more other vehicles, an approach of the autonomous vehicle based on the information about the position of the autonomous vehicle and information being received from the autonomous vehicle;

enabling, by the one or more other vehicles, sensors provided in the one or more other vehicles based on the approach of the autonomous vehicle being determined;

receiving, by the controller, information about an object sensed by the sensors provided in the one or more other vehicles parked around the autonomous vehicle from the one or more other vehicles through the communication device provided in the autonomous vehicle; and controlling, by the controller, autonomous driving around the one or more other vehicles based on the received information, wherein receiving the information about the object includes:

receiving, by the controller, the information about the object from the one or more other vehicles that are located in a driving direction of the autonomous vehicle; and not receiving, by the controller, the information about the object from the one or more other vehicles that are not located in the driving direction of the autonomous vehicle, and wherein controlling the autonomous driving around the one or more other vehicles includes:

determining, by the controller, motion of the object based on a change in information received from the one or more other vehicles; and controlling, by the controller, the autonomous driving based on the determined motion of the object, wherein the receiving of the information about the object sensed by the sensors provided in the one or more other vehicles parked around the autonomous vehicle from the one or more other vehicles, through the communication device, by the controller includes:

receiving, by the controller, information about a position of each of the one or more other vehicles, a parking direction of each of the one or more other vehicles, and a position where each of the sensors sensing the object is mounted on each of the one or more other vehicles, and wherein the controlling of the autonomous driving around the one or more other vehicles, based on the received information, by the controller includes:

determining, by the controller, information about a position of the object, based on the information about the position of each of the one or more other vehicles, the parking direction of each of the one or more other vehicles, and the position where each of the sensors sensing the object is mounted on each of the one or more other vehicles; and controlling, by the controller, the autonomous driving based on the determined information about the position of the object.

13. The autonomous driving control method of claim 12, wherein the controlling of the autonomous driving around the one or more other vehicles, based on the received information, by the controller includes:

determining, by the controller, at least one of a speed of the object or a movement direction of the object, based on a change in information received from the one or more other vehicles; and controlling, by the controller, the autonomous driving based on the at least determined one of the speed of the object or the movement direction of the object.

14. The autonomous driving control method of claim 12, further comprising:

obtaining, by the one or more other vehicles, an image of the object using cameras provided in the one or more other vehicles;

receiving, by the controller, the image of the object, through the communication device; and outputting, by the controller, the received image of the object, through a display device provided in the autonomous vehicle and configured to display various pieces of information.

15. The autonomous driving control method of claim 12, further comprising:

outputting, by the controller, information about a periphery of the autonomous vehicle, the information including information about a position of the object, through a display device provided in the autonomous vehicle and configured to display various pieces of information.

\* \* \* \* \*